United States Patent [19]

Stock et al.

[11] 4,421,771

[45] Dec. 20, 1983

[54] CHOCOLATE COVERED NUTRIENT BARS

[75] Inventors: Karl-Wilhelm Stock, Buettelborn, Fed. Rep. of Germany; Norman Brudney, Paris, France; Horst G. P. Wienecke, Gross-Gerau, Fed. Rep. of Germany

[73] Assignee: Richardson GmbH, Gross-Gerau, Fed. Rep. of Germany

[21] Appl. No.: 332,011

[22] Filed: Dec. 18, 1981

[30] Foreign Application Priority Data

[DE] Fed. Rep. of Germany .....................

[51] Int. Cl.³ ............................................. A21D 13/00
[52] U.S. Cl. ....................................... 426/94; 426/549
[58] Field of Search .................. 426/94, 572, 275, 549

[56] References Cited

U.S. PATENT DOCUMENTS 3,814,819  6/1974  Morgan ................................ 426/94

OTHER PUBLICATIONS

Tressler et al, *Food Products Formulary*, vol. 2 Avi Pub. Co. Inc., Conn. 1975, p. 237.
Bush et al, *Skuse's Complete Confectioner*, 13th Ed. W. J. Bush & Co., England, 1957, pp. 18 and 19.

*Primary Examiner*—Raymond N. Jones
*Assistant Examiner*—Elizabeth A. Hatcher
*Attorney, Agent, or Firm*—George W. Rauchfuss, Jr.

[57] ABSTRACT

Filling with water-containing new materials for nutrient bars with covering sheets made of waffles or the like with vegetable fibrous material especially wheat bran added to the water-containing raw materials and the moisture content of the filling amounts to 5 to 20 percent by weight. The addition of non-water-containing raw materials like oil seed products, such as hazel nut marrow, is possible.

6 Claims, No Drawings

CHOCOLATE COVERED NUTRIENT BARS

FIELD OF THE INVENTION

The invention refers to a filling for nutrient bars having water-containing raw materials.

BACKGROUND OF THE INVENTION

There are nutrient bars known which have a filling of chocolate, nuts and many other materials or their mixtures between two waffles, biscuits, wafers or the like. In order to maintain the original crunchiness of the baker's ware serving as covering sheets, such as waffles and the like, it is necessary to keep the water content of the filling small. Products of this kind known to be on the market have a moisture content in the filling of less than 5 percent by weight. Another possibility is to treat the bakery parts in such a way that they cannot absorb moisture. The moisture content of the filling then can be higher, such as for example, 15 percent by weight.

Both solutions, however, show disadvantages. In many cases it is difficult to reduce the moisture content of the filling in a sufficient extent because of the nature of the raw materials. The pre-treatment of the bakery part on the other hand requires additional steps of treatment. With the fillings according to this invention these problems do not arise since one can use untreated bakery parts and despite that can use fillings with relatively high moisture contents.

SUMMARY OF THE INVENTION

It surprisingly has been found that without a treatment of the covering sheets the moisture content of a filling can amount to more than 5 up to 20 percent by weight when one adds vegetable fibrous material to the filling. Such materials comprise bran, like for example wheat bran or carob kernel flour. Despite the high moisture content of the filling, the waffles or similar bakery pieces which serve as covering sheets remain crunchy after longer period of storing and the finished product has a good taste.

DETAILS OF THE INVENTION

The amount of the fibrous material added can vary in wide range between about 5 and 50% by weight and depends on the original humidity content of the raw materials of the filling. The amount of fibrous material to be added can be determined by easy calculation. It only is essential that the ready mixture including the fibrous material in its humidity content is within the given range.

As raw material of the filling, one can use various materials, especially honey, fruits, fruit marrow, fruit jellies or jam. To these water containing materials oil seed products can be added, such as for example, hazel nut marrow, cocoa butter or peanut butter. There are no restrictions with regard to the choice of the materials for the filling and consequently fillings of various kinds and compositions are possible and can be used according to this invention. The fillings can be brought between waffles or similar covering sheets in the known manner and one can apply a cover from chocolate, sugar or the like to this product.

The following example will exemplify the invention.

EXAMPLE

A filling is prepared by using the following components (all parts as parts by weight):
  36 parts honey
  20 parts fig paste
  14 parts hazel nut marrow
  4 parts cherries
  3 parts orangeade
  3 parts apricots.

After these components have been thoroughly mixed with each other, 20 parts roasted wheat bran is added. The moisture content of this mixture is 15 percent by weight.

The filling was applied to a waffle, was covered with a second waffle and then has been coated with chocolate. Even after a longer period of storage the waffles of this nutrient bar were as crunchy as prior to their incorporation into this bar.

We claim:

1. A chocolate covered bar having waffles, wafers or biscuits covering sheets portions and containing a filling, said filling comprising a water-containing raw material containing about 5 to 50% vegetable fibrous materials by weight of the filling and having a moisture content between 5 to 20 percent.

2. A nutrient bar according to claim 1 wherein the vegetable fibrous material is wheat bran.

3. A nutrient bar according to claim 2 wherein the filling additionally contains oil seed products.

4. A nutrient bar according to claim 3 wherein the oil seed product is hazel nut marrow.

5. A nutrient bar according to claim 2 wherein the wheat bran comprises about 20% by weight of the filling.

6. A nutrient bar according to claim 5 wherein the filling comprises, as parts by weight,
  36 parts honey
  20 parts fig paste
  14 parts hazel nut marrow
  4 parts cherries
  3 parts orangeade
  3 parts apricot
  20 parts roasted wheat bran
and wherein the moisture content of said filling is about 15% by weight and the covering sheets are waffles.

* * * * *